July 10, 1962 G. W. SCHULZ 3,043,322
HYDRAULIC PRESSURE GOVERNOR
Filed April 27, 1960 2 Sheets-Sheet 1

INVENTOR.
GEORGE W. SCHULZ
BY
ATTORNEYS.

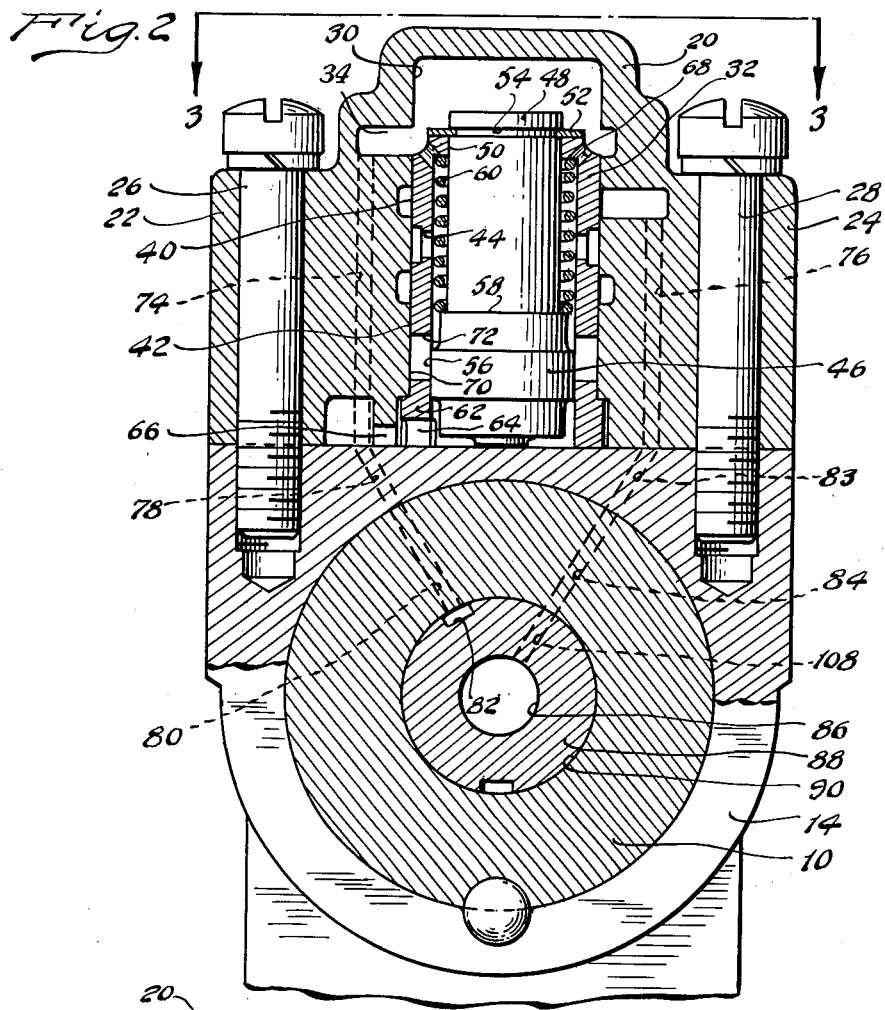
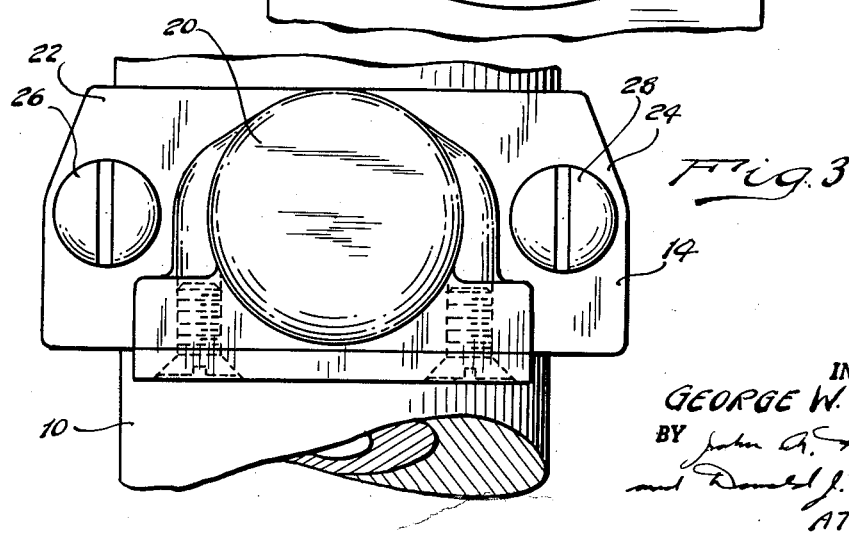

United States Patent Office 3,043,322
Patented July 10, 1962

1

3,043,322
HYDRAULIC PRESSURE GOVERNOR
George W. Schulz, Detroit, Mich., assignor to Ford Motor Company, Dearborn, Mich., a corporation of Delaware
Filed Apr. 27, 1960, Ser. No. 24,996
16 Claims. (Cl. 137—54)

My invention relates generally to a new and improved automatic speed senser, and more particularly to a fluid pressure governor mechanism capable of being incorporated in a fluid pressure control circuit for establishing a speed signal that may be utilized by the circuit as a control variable.

My improved governor mechanism is particularly adapted to be used in an automatic control circuit for a multiple speed, automotive, power transmission mechanism and it is capable of establishing a pressure signal that is proportional in magnitude to the vehicle road speed.

Such multiple speed power transmission mechanisms may include two pressure distributor valves or shift valves for separately controlling the distribution of fluid pressure from a pressure source to fluid pressure operated control servos. The control servos in turn condition the transmission mechanism for operation in any one of several available speed ratios. The shift valves are responsive to a torque demand signal and a vehicle road speed signal from the governor mechanism, and in this way the speed ratio shifts are established. The system is calibrated so that each speed ratio shift will take place at that road speed which will result in optimum performance of the vehicle power train for any given engine carburetor setting.

With automatic transmissions of known construction, the first gear ratio shift occurs at a relatively low vehicle speed, and for this reason it is desirable to make provision for increasing the sensitivity of the governor mechanism during operation in the lower speed range. Stated in another way, the rate of change in the magnitude of the governor pressure signal for any given speed change should be relatively great during operation in lower speeds. The governing characteristics of the governor mechanism during operation in the lower speed range determines in part the point at which the low speed shift valve initiates the first speed ratio change from a low speed ratio to an intermediate speed ratio.

In order to establish the optimum point at which the second or high speed shift valve is actuated, it is necessary to reduce the sensitivity of the governor valve mechanism during operation in the higher speed range. If the relationship between governor speed to governor pressure signal is represented graphically, the transition from one operating speed range to another is characterized by a break point or inflection point.

In certain prior art governor mechanisms this inflection point is obtained by altering the effective weight distribution of the centrifugally operated parts of the mechanism or by introducing sequentially applied spring forces which oppose the centrifugal valve actuating forces to which the governor valve mechanism is subjected. The centrifugal forces acting on the valve mechanism are opposed by a governor pressure force acting on a predetermined area on the movable portions of the valve mechanism.

It has been found that in certain prior art arrangements space limitations prevent the use of centrifugally operated parts with large masses. Consequently, valve sticking during operation in either the high speed range or the low speed range is often experienced.

I have overcome these shortcomings in the prior art devices by providing a governor mechanism with sufficiently large centrifugally responsive masses to eliminate the above described sticking problem. Further, I have made provision in my improved mechanism for obtaining the above described inflection point by altering the effective area on which the governor pressure acts while the effective centrifugal weight distribution remains unchanged. The large centrifugally responsive masses may then be employed throughout the entire speed range and the resulting centrifugal forces are then of sufficient magnitude to overcome the frictional resistance that results in valve sticking.

The provision of an improved governor mechanism of the type above described being a principal object of my invention, it is a further object of my invention to provide an automatic fluid pressure governor or speed senser with pressure regulating portions that require a minimum amount of space.

It is a further object of my invention to provide such a governor mechanism of the type above described which is reliable in operation and which is capable of providing a dependable speed signal during operation throughout a relatively broad speed range.

It is a further object of my invention to provide a governor valve mechanism of the type above described which is capable of being embodied in transmission mechanisms of known construction with a minimum amount of alteration being required.

For the purpose of more particularly describing a preferred embodiment of my invention, reference will be made to the accompanying drawings wherein:

FIGURE 2 is an enlarged transverse cross sectional view of my improved governor mechanism and it is taken along section line 2—2 of FIGURE 1;

FIGURE 3 is an elevation view of the governor mechanism shown in FIGURES 1 and 2 as viewed from the plane of section line 3—3 of FIGURE 2;

Figure 1:
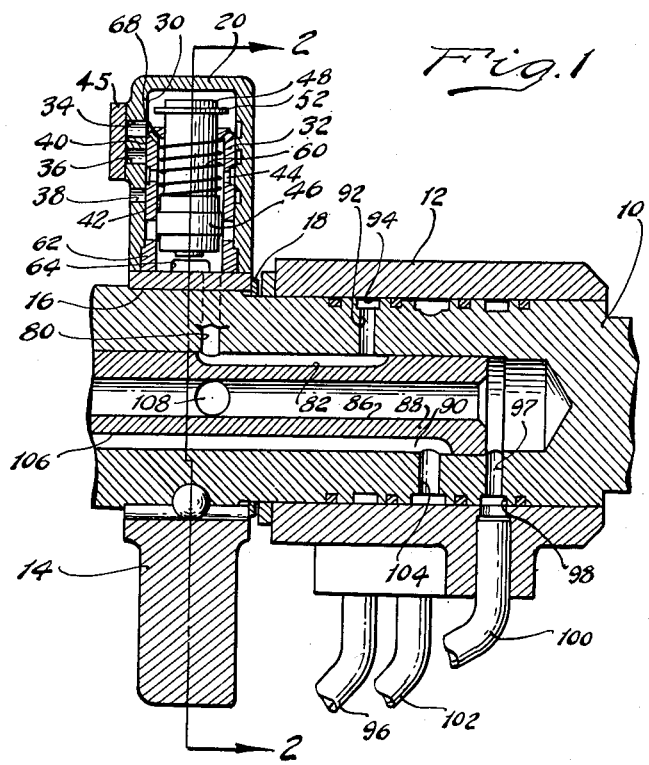
FIGURE 1 is a longitudinal cross sectional assembly view of my improved governor mechanism as it would be mounted on the power output tailshaft of an automotive type power transmission mechanism.

Referring first to FIGURE 1, numeral 10 generally designates a power output tailshaft for a multiple speed power transmission mechanism of the type above described. Shaft 10 is rotatably disposed within a relatively stationary sleeve 12 which may be suitably ported to accommodate the distribution of control pressure from a fluid pressure source and to accommodate the distribution of governor pressure made available by the governor mechanism.

A governor counterweight casting is shown at 14, and it is internally apertured at 16 so that shaft 10 can be received therethrough as indicated. The casting 14 is held in place on shaft 10 against a cooperating shoulder by means of a snap-ring 18. Casting 14 is formed with a flat on which is positioned a goveronr valve housing 20. Housing 20 is formed with transversely disposed bosses 22 and 24 through which clamping bolts 26 and 28 are received, said bolts being threadably received in cooperating threaded openings in casting 14.

Housing 20 is formed with an internal valve chamber 30, and a hollow valve element 32 is positioned in valve chamber 30 as indicated. A governor pressure port 34 and a cooperating groove are formed in housing 20 in communication with chamber 30. In a similar fashion a line pressure port is formed as shown at 36 in housing 20, and it also cooperates with an internal line pressure groove in the interior of chamber 30.

An exhaust port is formed in housing 20 as shown at 38, and it provides communication between the exterior of the assembly and the chamber 30. Port 38 cooperates with an exhaust groove formed within chamber 30.

The ports 34, 36 and 38 are positioned in radially spaced relationship, and they cooperate with valve lands 40 and 42 formed on valve element 32. A passage 44 is formed in valve element 32 at a location intermediate valve lands 40 and 42, said passage 44 communicating with the interior of valve element 32. The passage structure of which ports 34, 36 and 38 form a part is partly defined by a cover plate 45 as shown in FIGURE 1.

As best seen in FIGURE 2, a secondary valve element 46 is movably positioned within valve element 32 in telescopic relationship therewith. Element 46 is formed with a radially extended portion 48 that is received within an opening 50 formed in the radially outward part of valve element 32. Relative movement of element 46 with respect to element 32 in a radially inward direction is limited by a snap-ring 52 disposed in a snap-ring groove 54 in the extended portion 48 of valve element 46.

Element 46 is formed with a valve land 56 and with a spring seat 58. A spring 60 is interposed between seat 58 and the valve element 32 for normally urging the element 46 in a radially inward direction with respect to element 32.

The valve insert 62 is disposed within chamber 30 at a radially inward location, housing 20 and insert 62 being formed with cooperating shoulders whereby the insert 62 is maintained in a proper fixed position.

Insert 62 is formed with an opening 64 which communicates with an exhaust port 66 formed in housing 20. The radially inward region of the chamber 30 below the secondary valve element 46 is therefore continuously exhausted.

The annular space between valve element 46 and the surrounding valve element 32 which is occupied by spring 60 communicates with the radially outward region of chamber 30 through a port 68. The annular space occupied by spring 60 also communicates with an annular space 70 defined by valve element 46 and the surrounding chamber 30. This space 30 is situated on the radially inward side of valve element 32. Valve land 56 cooperates with the end 72 of valve element 32 to control the communication between the chamber occupied by spring 60 and the annular chamber 70. Valve land 56 further cooperates with insert 62 so that communication between annular space 70 and the exhaust port 66 may be controlled.

As shown in FIGURE 1, port 44 formed in valve element 32 is situated between exhaust port 38 and line-pressure port 36. When shaft 10 is rotated, valve element 32 and valve element 46 are subjected to centrifugal forces due to their own combined masses.

The degree of communication between port 44 and the two ports 36 and 38 is thereby influenced by the centrifugally induced response of the valve elements 32 and 46. At higher rotative speeds, the degree of communication between port 44 and port 36 tends to increase, and this is accompanied by a simultaneous tendency for the degree of communication between port 44 and port 38 to decrease. This results in a variable pressure in the annular space occupied by spring 60 and in the radially outward region of the chamber 30. The magnitude of this pressure is therefore an indicator of the speed of rotation of shaft 10.

The combined centrifugally induced forces acting on valve elements 32 and 46 are opposed by the pressure forces exerted on valve elements 46 and 32 by the governor pressure which exists in the radially outward portion of chamber 30.

When the valve elements 32 and 46 assume the relative position shown in FIGURE 2, the governor pressure which acts on the radially outward valve elements 32 and 46 also exists in the annular space 70 so that a governor pressure acts in a radially outward direction on the end 72 of valve element 32. The net effective area on which the governor pressure acts is therefore equal to the difference between the cross sectional area of chamber 30 and the annular area of the end 72 of valve element 32.

The spring 60 is calibrated with a predetermined preload. After a predetermined speed for shaft 10 is obtained, the spring 60 will yield under the centrifugal force acting on valve element 46. Relative movement will then take place between valve element 46 and valve element 32. When such movement takes place, the effective radius of the center of mass for valve element 46 will increase and this, of course, results in an increase in the centrifugally induced response of the valve element 46. The movement of valve element 46 with respect to valve element 32 will therefore occur with a minimum of hunting so that this relative movement may be referred to as a so-called snap action.

After this critical speed has been obtained, valve element 46 will assume the relative position shown in FIGURE 1. When the valve element 46 is so positioned, valve land 56 will interrupt communication between annular space 70 and the chamber occupied by spring 60. Valve land 56 will simultaneously open annular space 70 to the exhaust region so that the pressure in annular space 70 will be exhausted through exhaust port 66.

Since the governor pressure no longer acts on the end 72 of valve element 32, the net effective area on the valve elements 32 and 46 on which governor pressure acts is therefore increased. This change in area causes a change in the governing characteristics of the governor mechanism. Stated in another way, the rate at which the governor pressure is increased upon an increase in the speed of rotation of shaft 10 is of a lesser value after the valve element 46 assumes the position shown in FIGURE 1.

As best seen in FIGURE 2, governor pressure port 34 communicates with a passage 74 in valve housing 20, and line pressure port 36 communicates with a passage 76. Passage 74 communicates with the line pressure passages 78 and 80 formed in the casting 14 and in the shaft 10. Passage 80 in turn communicates with an axially extending groove 82 formed in shaft 10.

Passage 76 in housing 20 communicates with aligned passages 83 and 84 formed in casting 14 and in shaft 10 respectively. Passage 84 in turn communicates with an internal bore 86 formed in a fluid pressure distributor element 88 that is received within a cooperating axially extending bore 90 formed in shaft 10.

Referring more particularly to FIGURE 1, the distributor element 88 cooperates with the inner wall of bored opening 90 so that the groove 82 is effective to conduct governor pressure from passage 80 to a radial passage 92, the latter in turn communicating with a governor pressure groove 94. A governor pressure passage 96 is situated in communication with sleeve 12 and is in fluid communication with annular groove 94. The inner bore 86 of the fluid pressure distributor element 88 is in fluid communication with the end of bored opening 90 and with a radial passage 97 formed in shaft 10. Passage 97 in turn communicates with annular groove 98 which is in fluid communication with a line pressure inlet passage 100, the latter being suitably connected to sleeve 12.

A third passage 102 is in fluid communication with the radial passage 104 extending to an axially extending groove 106 in distributor element 88. Fluid pressure is distributed through groove 106 to fluid pressure operated components of the transmission mechanism.

Line pressure is distributed from passage 100 to the bored opening 86 and through a radial passage 108 formed in distributor element 88. Passage 108 communicates with passage 84 so that line pressure is transferred through passages 82 and 76 to the line pressure port 36.

Governor pressure is distributed from governor pressure port 34 through communicating passages 74, 78 and 80 to groove 82. The governor pressure is then distributed through passage 92 and passage 96 to speed sensitive parts of the control mechanism for the automatic transmission.

Figure 4:
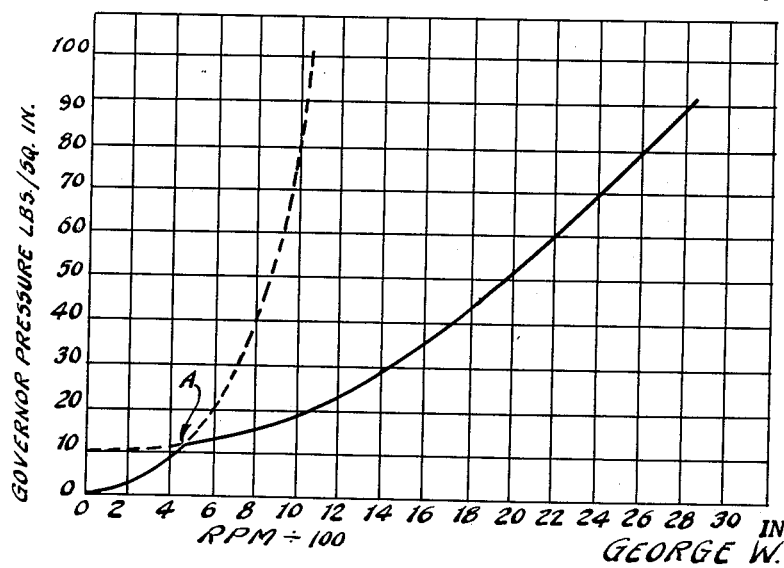
FIGURE 4 is a performance graph showing the relationship between governor pressure and tailshaft speed which is characteristic of my improved governor mechanism.

Referring next to FIGURE 4, I have illustrated the governing characteristics of the mechanism previously described. The inflection point A on the chart indicates the point at which a change in the effective fluid pressure area of the centrifugally operated parts of the mechanism is produced. This also corresponds to the speed at which the valve element 46 moves radially outward with respect to valve element 32, as previously described.

It may be seen in FIGURE 4 that rate of change in the governor pressure signal which is experienced due to changing road speeds is considerably greater in the lower speed range than it is in the upper speed range. The optimum pressure signal for influencing the operation of the first and second speed ratio shift valve can then be obtained, and this is then followed by the optimum governing characteristics for establishing the desired shift point for a speed change from an intermediate speed ratio to a high speed ratio.

The effective mass of the centrifugally operated parts of the mechanism remains unchanged regardless of the speed range in which the governing mechanism is operating. The inflection point A is obtained merely by reason of the change in effective area on which the governor pressure is caused to act.

Having thus described a preferred embodiment of my invention, what I claim and desire to secure by United States Letters Patent is:

1. A fluid pressure governor comprising a valve body, said body being secured to a rotary member, a bipartite valve element disposed in said valve body, a fluid pressure inlet port and a fluid pressure outlet port in said valve body, said valve element being responsive to centrifugal force to control the degree of communication between said ports and to establish a governor pressure signal in said outlet port that is proportional in magnitude to the speed of rotation of said rotary member, said valve element having opposed fluid pressure areas, said areas being subjected to said governor pressure to oppose and tend to balance said centrifugal force, one part of said valve element being movable with respect to the other, means for yieldably opposing such relative motion, and cooperating pressure distributing portions on said valve element parts adapted to selectively control the distribution of governor pressure to one of said pressure areas whereby the net effective area of said valve element on which governor pressure is caused to act is changed when the speed of rotation of said rotary member increases from a value less than a predetermined value to a value greater than that predetermined value.

2. A fluid pressure governor comprising a valve body, said valve body being secured to a rotary member, a valve chamber in said valve body, a primary valve element in said valve chamber, a control pressure inlet port and a governor pressure port formed in said valve chamber, said primary valve element being responsive to centrifugal force and adapted to control the degree of fluid communication between said ports, a secondary valve element disposed in relative sliding relationship with respect to said primary valve element, means for yieldably opposing relative motion between said valve elements, and means for distributing the pressure in said governor pressure port to opposed fluid pressure areas on said valve elements, said valve elements having cooperating valve lands adapted to control the distribution of fluid pressure to one of said areas, said valve lands blocking distribution of pressure to said one area during operation of said rotary member at relatively high speeds of rotation and accommodating distribution of fluid pressure to said one area at relatively low speeds of rotation.

3. A fluid pressure governor comprising a valve body, said valve body being secured to a rotary member, a bipartite valve element disposed in said valve body, a fluid pressure inlet port and a fluid pressure outlet port in said valve body, said valve element being responsive to centrifugal force to control the degree of communication between said ports and to establish a governor pressure signal in said outlet port that is proportional in magnitude to the speed of rotation of said rotary member, said valve element having opposed fluid pressure areas, said areas being subjected to said governor pressure whereby opposed governor pressure forces on said valve element are established, the force differential between said governor pressure forces opposing and tending to balance said centrifugal force, one part of said valve element being movable relative to the other, means for yieldably opposing such relative motion, cooperating portions of said valve element parts being adapted to selectively control distribution of governor pressure to one of said pressure areas, the governor pressure acting on said one area creating a radially outward pressure force, the net effective area on said valve element on which governor pressure forces act thereby being changed when the speed of rotation of said rotary member changes from a value less than a predetermined value to a speed greater than that predetermined value.

4. A fluid pressure governor comprising a valve body, said valve body being secured to a rotary member, a valve chamber in said valve body, a primary valve element in said valve chamber, a plurality of lands in said valve chamber, a control pressure inlet port, an exhaust port and a governor pressure outlet port in said valve chamber, said exhaust port communicating with an exhaust region, said primary valve element being responsive to centrifugal force and adapted to control the degree of communication between said ports, a secondary valve element disposed in relative sliding relationship with respect to said primary valve element, means for yieldably urging said valve elements in opposed radial directions, means for distributing the pressure in said governor pressure port to opposed fluid pressure areas on said valve elements whereby opposed radially inward and radially outward governor pressure forces are established on said valve elements, said valve elements having cooperating valve lands adapted to control the distribution of fluid pressure to one of said areas on which a radially outward fluid pressure force acts, said valve lands blocking distribution of governor pressure to said one area during operation of said rotary member at relatively high speeds of rotation and accommodating distribution of pressure thereto at lower speeds, said secondary valve element and one of said plurality of valve lands establishing communication between said one area and said exhaust region in alternating sequence with the blocking of the distribution of pressure to said one area.

5. A fluid pressure governor comprising a valve body, said valve body being secured to a rotary member, a bipartite valve element disposed in said valve body, a fluid pressure inlet port and a fluid pressure outlet port in said valve body, said valve element being responsive to centrifugal force to control the degree of communication between said ports and to establish a governor pressure signal in said outlet port that is proportional in magnitude to the speed of rotation of said rotary member, the radially inward end of one part of said valve element and the radially outward end of each part of said valve element being in communication with said outlet port whereby a differential pressure force is established which tends to balance and opposes said centrifugal force, one part of said valve element being movable relative to the other in response to centrifugal force acting on said one part, means for yieldably opposing such relative motion, cooperating portions of said valve element parts being adapted to selectively control the distribution of governor pressure to the radially inward end of said one valve element part whereby the net effective area on said element on which governor pressure is caused to act is increased when the speed of rotation of said rotary member increases from a value less than a predetermined value to a value greater than that predetermined value.

6. A fluid pressure governor comprising a valve body, said valve body being secured to a rotary member, a valve chamber in said valve body, a primary valve element in said valve chamber, a control pressure inlet port and a governor pressure outlet port formed in said valve chamber, said primary valve element being responsive to centrifugal force and adapted to control the degree of communication between said ports, a secondary valve element disposed in relative sliding relationship with respect to said primary valve element, means for yieldably connecting said secondary valve element and said primary valve element, and means for distributing the pressure in said governor pressure port to the radially outward end of each of said valve elements and to the radilly inward end of one of said valve elements, said valve elements having cooperating valve lands adapted to control the distribution of fluid pressure to the radially inward end of said one valve element, said valve lands being adapted to block distribution of pressure to said radially inward end during operation of said rotary member at relatively high speeds of rotation and accommodating distribution of pressure thereto at lower speeds.

7. A fluid pressure governor comprising a valve body, said valve body being secured to a rotary member, a bipartite valve element disposed in said valve body, a plurality of valve lands in said valve body, a fluid pressure inlet port, an exhaust port and a fluid pressure outlet port in said valve body, said exhaust port communicating with an exhaust region, said valve element being responsive to centrifugal force to control the degree of communication between said ports and to establish a governor pressure signal in said outlet port that is proportional in magnitude to the speed of rotation of said rotary member, the radially inward end of one part of said valve element and the radially outward end of each part of said valve element being in communication with said outlet port whereby a differential pressure force is established which balances and opposes said centrifugal force, said valve elements being movable relative to each other in response to centrifugal force acting thereon, means for yieldably opposing such relative motion, cooperating portions of said valve element parts being adapted to selectively control the distribution of governor pressure to the radially inward end of said one valve element part whereby the net effective area on said element on which governor pressure is caused to act is increased when the speed of rotation of said rotary member increases from a value less than a predetermined value to a value greater than that predetermined value, the other valve element part and one of said plurality of valve lands being adapted to establish communication between said radially inward end and said exhaust region in alternating sequence with the blocking of distribution of governor pressure to said radially inward end.

8. A fluid pressure governor comprising a valve body, said valve body being secured to a rotary member, a valve chamber in said valve body, a primary valve element in said valve chamber, a plurality of valve elements in said valve chamber, a control pressure inlet port, an exhaust port and a governor pressure outlet port formed in said valve chamber, said exhaust port communicating with an exhaust region, said primary valve element being responsive to centrifugal force and adapted to control the degree of communication between said ports, a secondary valve element disposed in relative sliding relationship with respect to said primary valve element, means for yieldably opposing such relative motion, and means for distributing the pressure in said governor pressure port to the radially outward end of each of said valve elements and to the radially inward end of one of said valve elements, said valve elements having cooperating valve lands adapted to control the distribution of fluid pressure to the radially inward end of said one valve element, said valve lands being adapted to block distribution of pressure to said radially inward end during operation of said rotary member at relatively high speeds of rotation and accommodating distribution of pressure thereto at lower speeds, said secondary valve element and one of said valve lands being adapted to establish communication between said radially inward end and said exhaust region in alternating sequence with the blocking of distribution of governor pressure to said radially inward end.

9. A fluid pressure governor comprising a valve body, said valve body being secured to a rotary member, a valve chamber in said valve body, a control pressure inlet port and a governor pressure outlet port in said valve body, a hollow valve element in said valve chamber having valve lands formed thereon which slidably cooperate with said valve ports, said valve element being responsive to centrifugal force and adapted to control the degree of communication between said ports, and a secondary valve element telescopically received within said hollow valve element, internal passage structure defined in part by said valve elements for distributing governor pressure from said governor pressure port to the radially inward end of said hollow valve element, said valve elements having cooperating valve lands, said valve lands defining in part said passage structure and adapted to interrupt communication between said governor pressure port and the radially inward end of said hollow valve element when said secondary valve element moves radially outward with respect to said hollow valve element under the influence of centrifugal force, and means for yieldably opposing such relative motion, the radially outward ends of said valve elements being subjected to the governor pressure in said outlet port, the net effective area on which said governor pressure is caused to act being greater at relatively high rotative speeds when said valve lands assume a passage structure closing position.

10. A fluid pressure governor comprising a valve body, said valve body being secured to a rotary member, a valve chamber in said valve body, a primary valve element in said valve chamber, a control pressure inlet port and a governor pressure outlet port in said valve chamber, a primary valve element cooperating with said ports to control the degree of communication between said ports, said valve element being responsive to centrifugal force during operation, and a secondary valve element telescopically related with respect to said first valve element and movable in a radially outward direction with respect to said first valve element in response to increasing speeds of rotation of said rotary member, means for yieldably opposing such relative motion, said valve elements having cooperating valve lands, internal passage structure in said valve elements for distributing governor pressure from said governor pressure outlet port to the radially inward end of said first valve element, and means for distributing governor pressure to the radially outward ends of said valve elements, said passage structure being defined in part by said valve lands, the latter interrupting communication between said governor pressure port and the radially inward end of said first valve element when the speed of said rotary member exceeds a precalibrated value, the net effective area on which governor pressure is caused to act thereby being increased when the rotary speed of said rotary member exceeds a predetermined value.

11. A fluid pressure governor comprising a valve body, said valve body being secured to a rotary member, a valve chamber in said valve body, a control pressure inlet port and a governor pressure outlet port in said valve body, a hollow valve element in said valve chamber having valve lands formed thereon which slidably cooperate with said valve ports, said valve element being responsive to centrifugal force and adapted to control the degree of communication between said ports, and a secondary valve element telescopically received within said hollow valve element, internal passage structure defined in part by said valve elements for distributing governor pressure from said governor pressure port to the radially inward end of said hollow valve element, said valve elements having cooperating valve lands, said valve lands defining in part said passage structure and adapted to interrupt communication between said governor pressure port and the radially inward end of said hollow valve element when said secondary valve element moves radially outward with respect to said hollow valve element under the influence of centrifugal force, the radially outward ends of said valve elements being subjected to the governor pressure in said outlet port, the net effective area on which said governor pressure is caused to act being greater at relatively high rotative speeds when said valve lands assume a passage structure closing position, and spring means interposed between said valve elements for normally opposing the influence of centrifugal force on said secondary valve element.

12. A fluid pressure governor comprising a valve body, said valve body being secured to a rotary member, a valve chamber in said valve body, a primary valve element in said valve chamber, a control pressure inlet port and a governor pressure outlet port in said valve chamber, a primary valve element cooperating with said ports to control the degree of communication between said ports, said valve element being responsive to centrifugal force during operation, a secondary valve element telescopically related with respect to said first valve element and movable in a radially outward direction with respect to said first valve element in response to increasing speeds of rotation of said rotary member, said valve elements having cooperating valve lands, internal passage structure in said valve elements for distributing governor pressure from said governor pressure outlet port to the radially inward end of said first valve element, means for distributing governor pressure to the radially outward ends of said valve elements, said passage structure being defined in part by said valve lands, the latter interrupting communication between said governor pressure port and the radially inward end of said first valve element when the speed of said rotary member exceeds a precalibrated value, the net effective area on which governor pressure is caused to act thereby being increased when the rotary speed of said rotary member exceeds a predetermined value, and spring means interposed between said valve elements for normally urging said secondary valve element toward a passage structure opening position.

13. A fluid pressure governor comprising a valve body, said valve body being secured to a rotary member, a valve chamber in said valve body, a plurality of lands in said valve chamber, a control pressure inlet port, an exhaust port and a governor pressure outlet port in said valve body, said exhaust port communicating with an exhaust region, a hollow valve element in said valve chamber having valve lands formed thereon which slidably cooperate with said valve ports, said valve element being responsive to centrifugal force and adapted to control the degree of communication between said ports, and a secondary valve element telescopically received within said hollow valve element, internal passage structure defined in part by said valve elements for distributing governor pressure from said governor pressure port to the radially inward end of said hollow valve element, said valve elements having cooperating valve lands, said valve lands defining in part said passage structure and adapted to interrupt communication between said governor pressure port and the radially inward end of said hollow valve element when said secondary valve element moves radially outward with respect to said hollow valve element under the influence of centrifugal force, the radially outward ends of said valve elements being subjected to the governor pressure in said outlet port, the net effective area on which said governor pressure is caused to act being greater at relatively high rotative speeds when said valve lands assume a passage structure closing position, and spring means interposed between said valve elements for normally opposing the influence of centrifugal force on said secondary valve element, the secondary valve element and one of the lands in said valve chamber being adapted to establish communication between the radially inward end of said one valve element and the exhaust region in alternating sequence with the interruption of communication between the radially inward end of said one valve element and said governor pressure port.

14. A fluid pressure governor comprising a valve body, said valve body being secured to a rotary member, a valve chamber in said valve body, a primary valve element in said valve chamber, a plurality of lands in said valve chamber, a control pressure inlet port, an exhaust port and a governor pressure outlet port in said valve chamber, said exhaust port communicating with an exhaust region, a primary valve element cooperating with said ports to control the degree of communication between said ports, said valve element being responsive to centrifugal force during operation, a secondary valve element telescopically related with respect to said first valve element and movable in a radially outward direction with respect to said first valve element in response to increasing speeds of rotation of said rotary member, said valve elements having cooperating valve lands, internal passage structure in said valve elements for distributing governor pressure from said governor pressure outlet port to the radially inward end of said first valve element, means for distributing governor pressure to the radially outward ends of said valve elements, said passage structure being defined in part by said valve lands, the latter interrupting communication between said governor pressure port and the radially inward end of said first valve element when the speed of said rotary member exceeds a precalibrated value, the net effective area on which governor pressure is caused to act thereby being increased when the rotary speed of said rotary member exceeds a predetermined value, and spring means interposed between said valve elements for normally urging said secondary valve element toward a passage structure opening position, the secondary valve element and one of said plurality of valve lands being adapted to establish communication between the radially inward end of said one valve element and the exhaust region in alternating sequence with the interruption of communication between the radially inward end of said one valve element and said governor pressure port.

15. A fluid pressure governor comprising a valve body, said valve body being secured to a rotary member, a valve chamber formed in said valve body, a line pressure port, a governor pressure port and an exhaust port formed in said valve body in communication with said valve chamber, a first valve element slidably positioned in said valve chamber and acting in response to centrifugal force to control the degree of communication between said line pressure port and said exhaust port and between said line pressure port and said governor pressure port, said valve element thereby establishing a governor pressure in said governor pressure port which is functionally related in magnitude to the speed of rotation of said rotary member, said governor pressure communicating with the radially outward region of said valve chamber, a second valve element slidably positioned within said first valve element, said first valve element having a pressure port located intermediate the line pressure port and said exhaust port, internal passage means defined in part by said last mentioned port for distributing governor pressure from said governor pressure port to the radially inward end of said first valve element, said valve elements having cooperating valve lands, said passage structure being defined in part by said valve lands, the latter interrupting communication between said governor pressure port and the radially inward end of said first valve element when said second valve element moves radially outward with respect to said first valve element in response to an increase in the speed of rotation of said rotary member, and means for yieldably opposing such relative motion, the net effective area on which the governor pressure is caused to act on said valve elements thereby being greater when the speed of rotation of said rotary member is greater than a predetermined value.

16. A fluid pressure governor comprising a valve body, said valve body being secured to a rotary member, a valve chamber formed in said valve body, a line pressure port, a governor pressure port and an exhaust port formed in said valve body in communication with said valve chamber, a first valve element slidably positioned in said valve chamber and acting in response to centrifugal force to control the degree of communication between said line pressure port and said exhaust port and between said line pressure port and said governor pressure port, said valve element thereby establishing a governor pressure in said governor pressure port which is functionally related in magnitude to the speed of rotation of said rotary member, said governor pressure communicating with the radially outward region of said valve chamber, a second valve element slidably positioned within said first valve element, said first valve element having a pressure port located intermediate the line pressure port and said exhaust port, internal passage means defined in part by said last mentioned port for distributing governor pressure from said governor pressure port to the radially inward end of said first valve element, said valve elements having cooperating valve lands, said passage structure being defined in part by said valve lands, the latter interrupting communication between said governor pressure port and the radially inward end of said first valve element when said second valve element moves radially outward with respect to said first valve element in response to an increase in the speed of rotation of said rotary member, the net effective area on which the governor pressure is caused to act on said valve elements thereby being greater when the speed of rotation of said rotary member is greater than a predetermined value and the spring means interposed between said valve elements for normally biasing said second valve element toward a radially inward position with respect to said first valve element.

References Cited in the file of this patent
UNITED STATES PATENTS

| | | |
|---|---|---|
| 2,711,749 | Hettinger | June 28, 1955 |
| 2,738,650 | McAfee | Mar. 20, 1956 |
| 2,876,784 | Adams | Mar. 10, 1959 |
| 2,911,987 | Wayman | Nov. 10, 1959 |